(12) United States Patent
Karlock

(10) Patent No.: US 6,172,716 B1
(45) Date of Patent: *Jan. 9, 2001

(54) VIDEO PROCESSING CIRCUIT

(76) Inventor: James A. Karlock, 3311 NE., Portland, OR (US) 97212

(*) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/788,851

(22) Filed: Jan. 25, 1997

(51) Int. Cl.[7] ........................................ H04N 5/14
(52) U.S. Cl. .................... 348/575; 348/501; 348/712; 348/713
(58) Field of Search .................. 348/663, 678, 348/682, 695, 712, 575, 522, 571, 501, 708, 713, 659; H04N 9/64, 5/14

(56) References Cited

U.S. PATENT DOCUMENTS

| 4,604,646 | * | 8/1986 | Karlock | 348/522 |
| 5,339,114 | * | 8/1994 | Lagoni et al. | 348/673 |
| 5,379,075 | * | 1/1995 | Nagasawa et al. | 348/678 |

* cited by examiner

Primary Examiner—Michael Lee
(74) Attorney, Agent, or Firm—Dellett and Walters

(57) ABSTRACT

Improved circuitry for adjusting the video gain, black level, chroma gain and burst phase of a video signal includes composite to Y/C splitter, luminance processing section, sync separator and chroma processor. Unity and split mode selection is provided. A meter circuit provides display of black and white levels as well as clip indication.

20 Claims, 12 Drawing Sheets

BLOCK DIAGRAM

COMPOSITE VIDEO
TO Y/C SPLITTER

LUMINANCE PROCESSOR

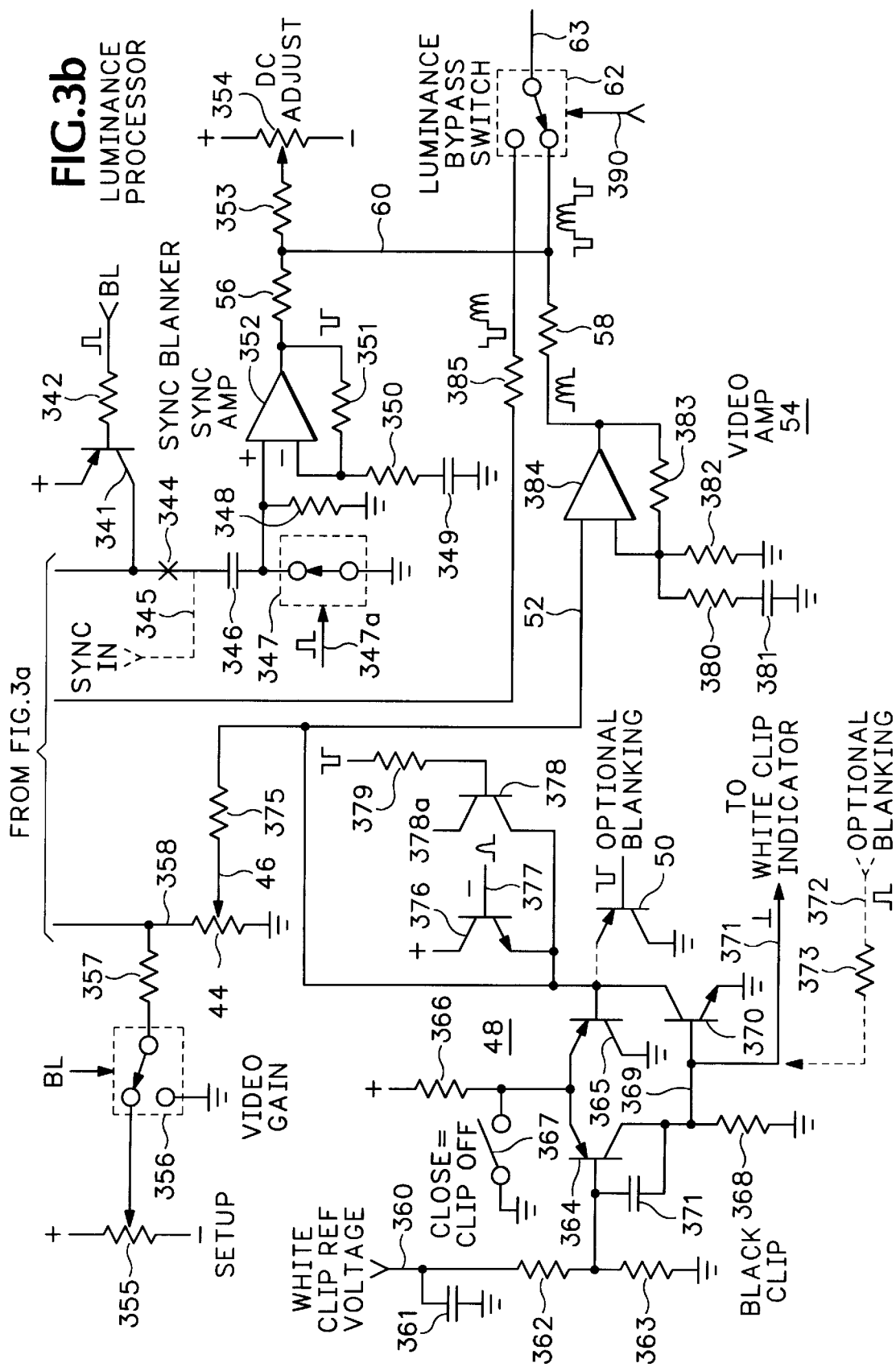
FIG.3b LUMINANCE PROCESSOR

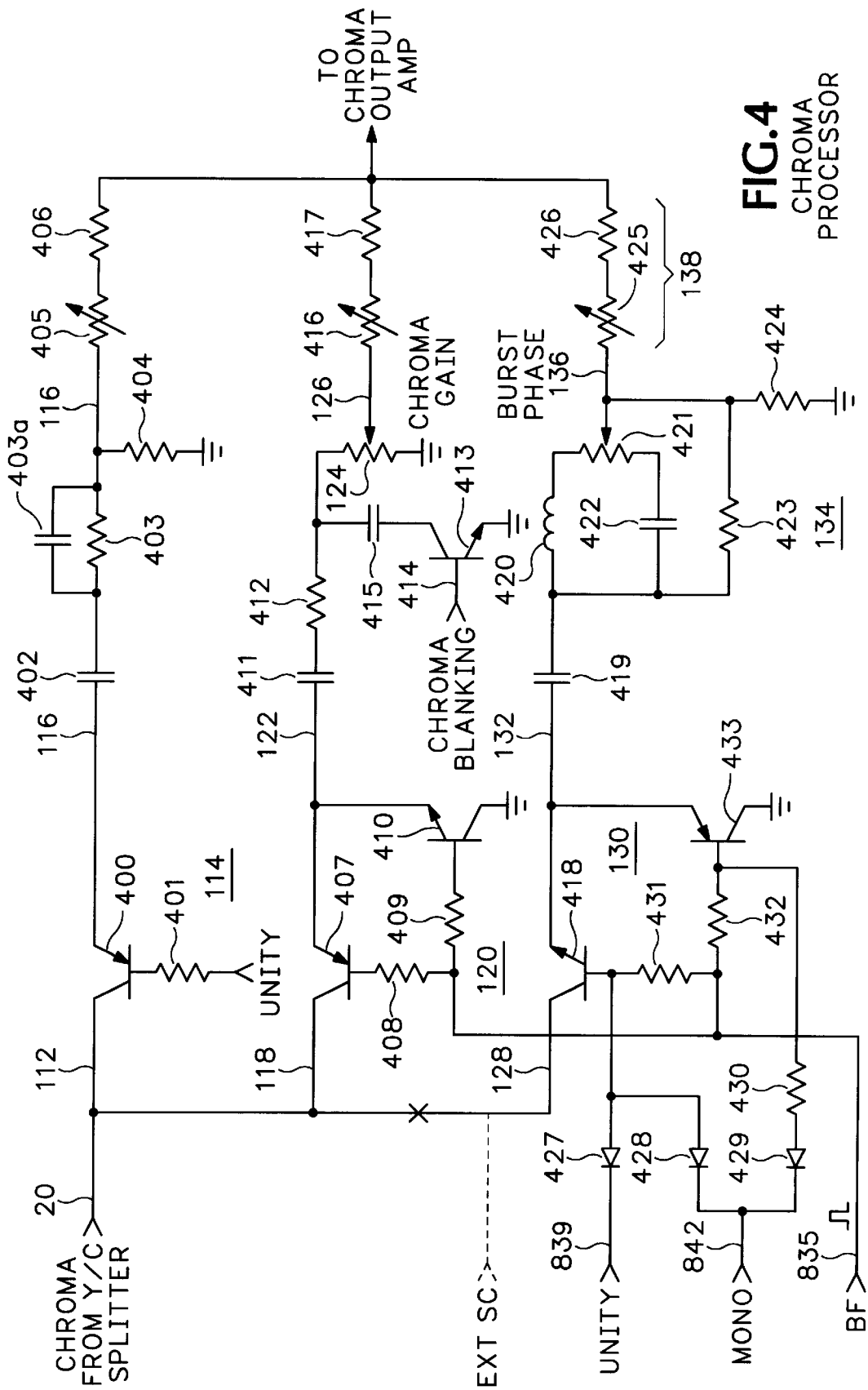
FIG.4 CHROMA PROCESSOR

OUTPUT AMPLIFIER AND COMPOSITE SUM

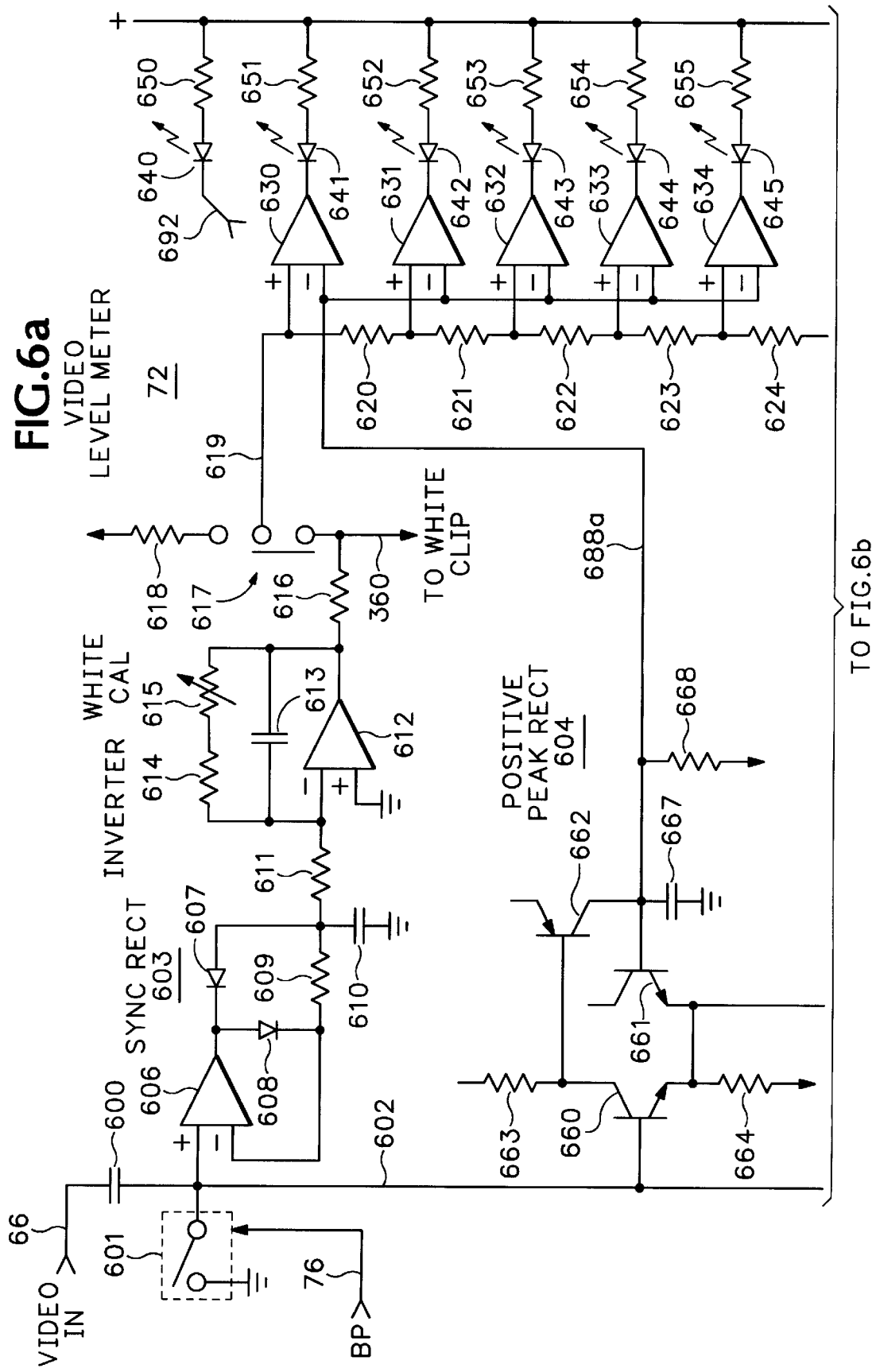
FIG.6a VIDEO LEVEL METER 72

VIDEO LEVEL METER

WIDE BLANKING GEN

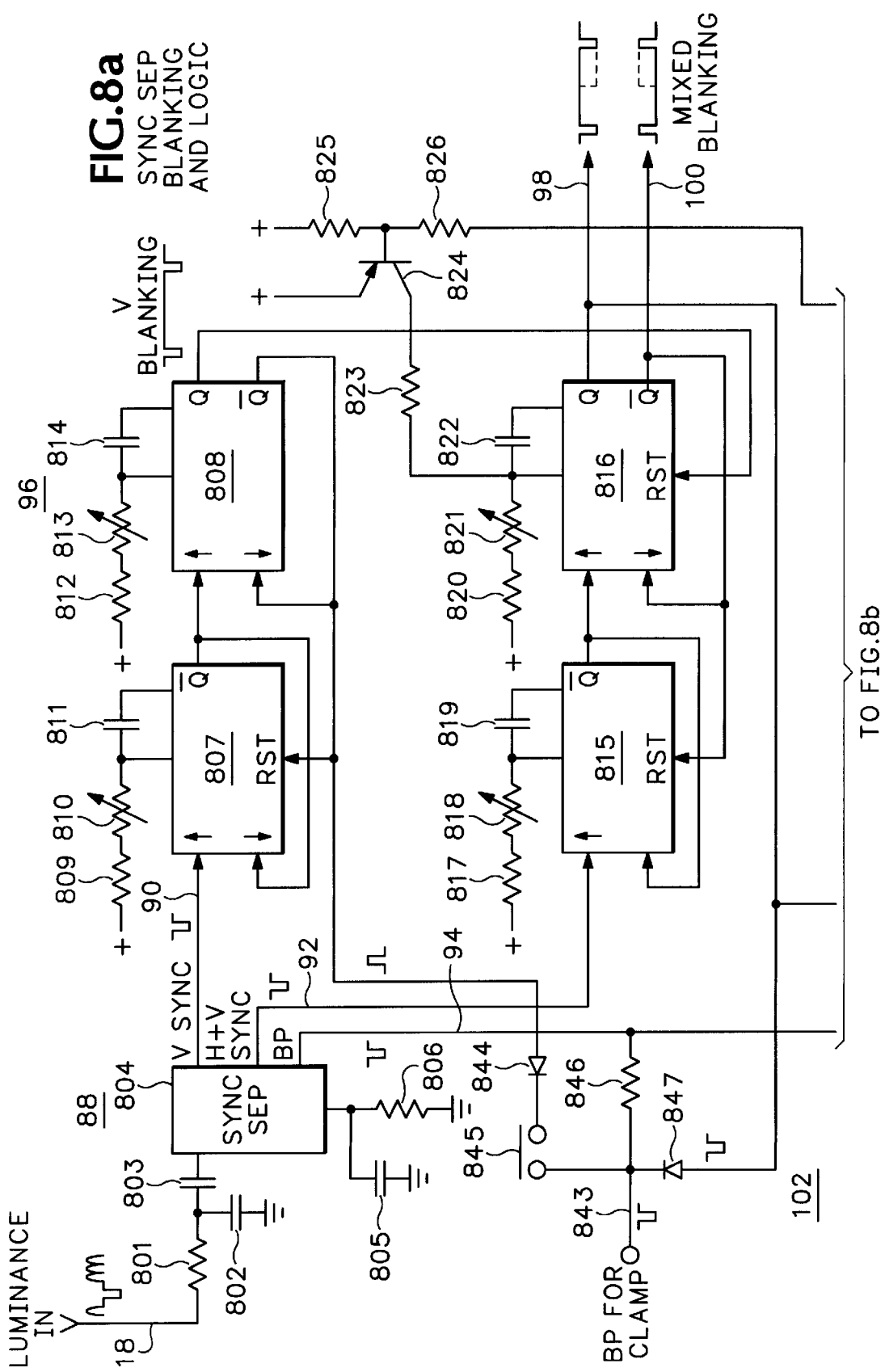

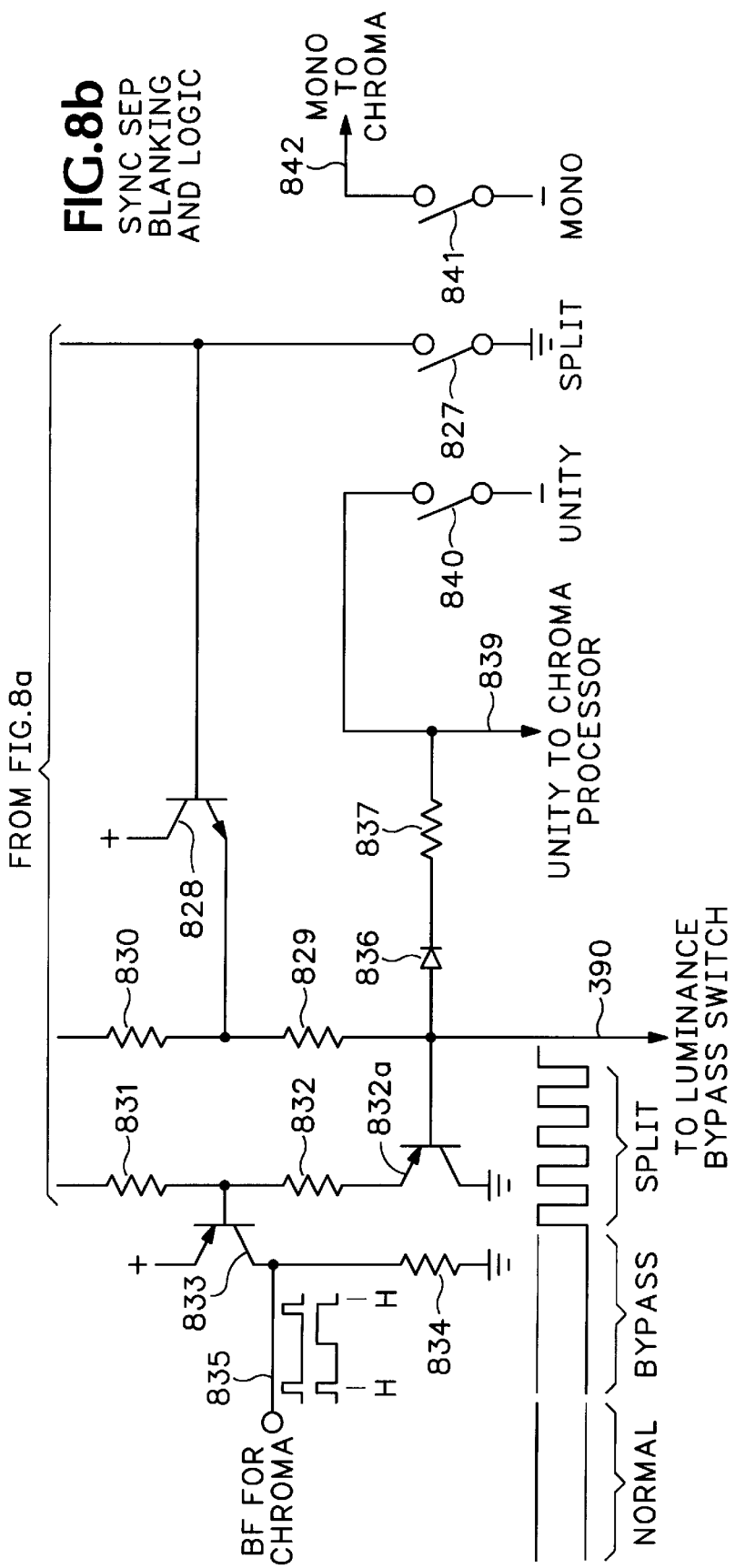

LEVEL METER DISPLAY

LEVEL METER DISPLAY

LEVEL METER DISPLAY

LEVEL METER DISPLAY

LEVEL METER DISPLAY

VIDEO PROCESSING CIRCUIT

BACKGROUND OF THE INVENTION

This invention relates to certain improvements to circuitry for adjusting the video gain, black level, chroma gain and burst phase of a video signal.

While my previous U.S. Pat. No. 4,604,646 disclosed a satisfactory method and apparatus for such adjustments, newer components permit a simpler more cost effective apparatus with more performance.

OBJECT OF THE INVENTION

The object of the present invention is to provide more economic circuitry for adjusting the video gain, black level, chroma gain and burst phase of a video signal, while at the same time improving its performance.

This was accomplished by taking the original block diagram of U.S. Pat. No. 4,604,646 and simplifying each section while adding an adjustment for video black level and adding metering circuitry to meter the black level. Additionally, the ability to accept separate chroma and luminance video signals, known as Y/C, input and provide an Y/C output was added.

SUMMARY OF THE INVENTION

A video input is received by the composite video to Y/C splitter which provides the luminance portion of the video signal to the luminance processing section and to the synchronizing signal (sync) separator, while also providing the chroma component to the chroma processor.

The luminance processor includes a back porch clamp to supply video with a constant back porch voltage to the sync splitter which splits the sync from the main video signal and directs it to a separate signal path for special processing. The syncless video is applied to a potentiometer which serves as a video gain control whose output is applied to a white clipper which ensures that an excessive video signal cannot be outputted. The video is then amplified and summed with the previously split off sync to form a normal video signal.

The split off sync signal is optionally amplified and clipped to output a standard amplitude over a range of input amplitudes. Optionally sync can be taken from the sync separator or an external sync source. The sync signal is then blanked to remove any residual, DC restored and supplied to the sync summer.

An electronic SPST switch selects between the luminance processor output and the output of the composite video to Y/C splitter to provide a user option of UNITY gain or no processing as well as a split screen function.

The switched luminance is then amplified to provide a standard video level to the luminance output connector.

The chroma processor receives its input from the chroma output of the composite video to Y/C splitter and is provided to three parallel paths—burst processing, active picture processing and unity, only one of which is active at any one time. The three outputs of the three paths are summed in a chroma amplifier which provides the output signal to the chroma output connector.

The luminance and chroma signals are summed to provide a composite output to the composite output connector.

A sync separator receives video from luminance output of the composite video to Y/C splitter and provides horizontal and vertical sync as well as a burst pulse. These waveforms are used to generate a clamp pulse, burst gate, and blanking waveforms. User controlled front panel switches modify these waveforms to provide a UNITY mode in which all processing is set to neutral or UNITY, a SPLIT screen function in which one side of the screen is processed and the other side is UNITY and a MONO function which removes any color burst that might be present.

The subject matter of the present invention is particularly pointed out and distinctly claimed in the concluding portion of this specification. However, both the organization and method of operation, together with further advantages and objects thereof, may best be understood by reference to the following detailed description and accompanying drawings.

BRIEF DESCRIPTION OF THE DRAWINGS

FIGS. 3a and 3b show the luminance processing section,

FIG. 4 shows the chroma processing section,

FIGS. 6a and 6b show the video level meter circuit,

FIGS. 8a and 8b show the sync separator, blanking generator and mode logic, and

DETAILED DESCRIPTION OF THE PREFERRED EMBODIMENT

Figure 2:
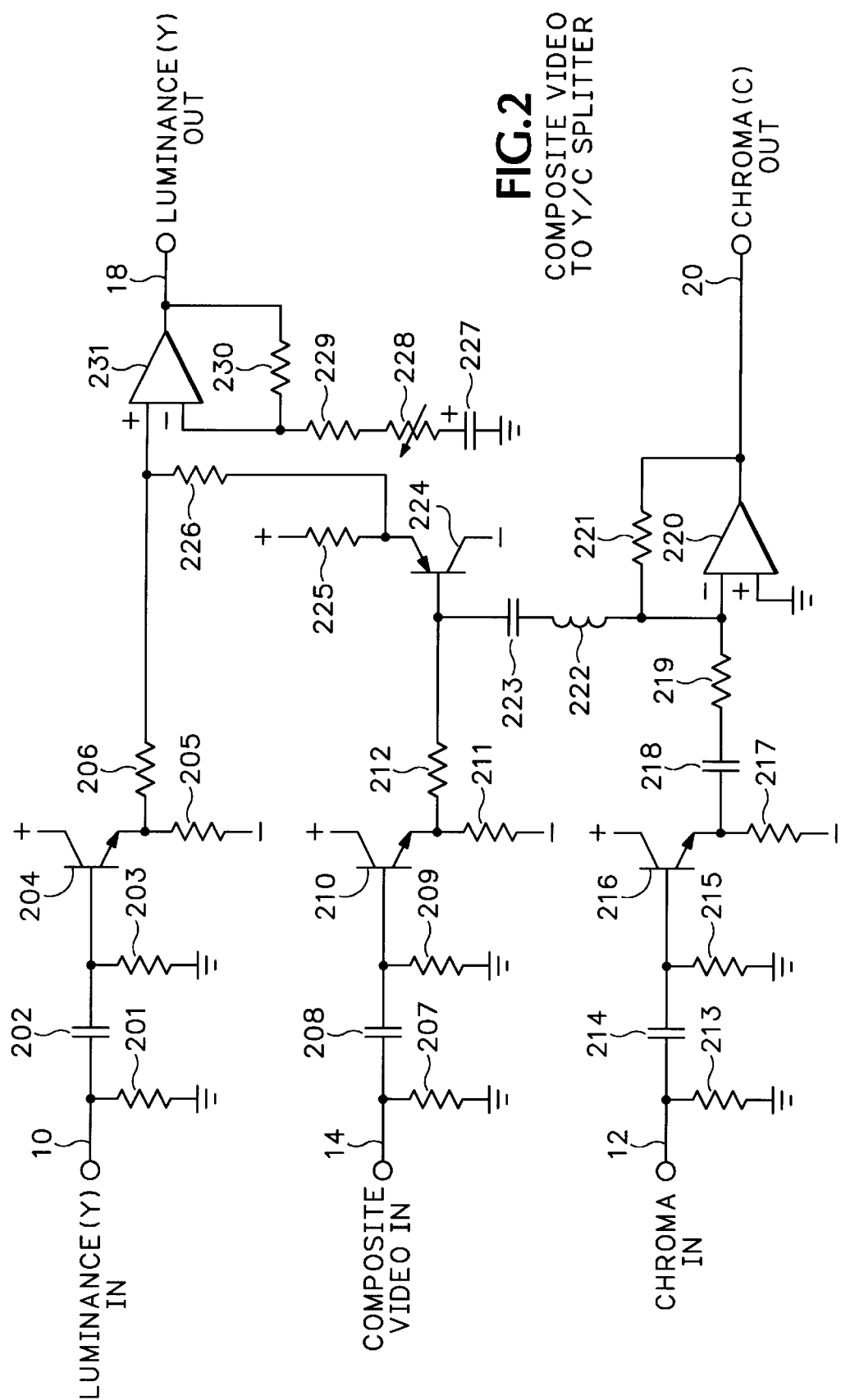
FIG. 2 shows the composite video to Y/C components splitter.

FIG. 2 shows that input video is applied either in composite form to the composite input connector 14 or, if in split form, luminance is applied to input connector 10 while chrominance is applied to input connector 12. Termination resistors 201, 207 and 213 serve to establish a nominal input impedance for each of the three inputs, commonly 75, ohms while capacitors 202, 208 and 214 couple the various signals to the bases of the various input amplifiers 204, 210 and 216. Resistors 203, 209 and 215 bias the inputs of said input amplifiers while resistors 205, 211 and 217 serve as load resistors for said amplifiers.

If a signal is applied to the composite input 14 it will be amplified by amplifier 210 and travel through resistor 212. Since capacitor 223 and inductor 222 form a series resonant circuit whose impedance is a minimum at the chroma subcarrier frequency, the subcarrier component of the composite video signal traveling through resistor 212 is shunted through said resonant circuit to the (−) input of amplifier 220 which is a very low impedance due to the negative feedback through resistor 221. Thus said chroma signal appears at the output of amplifier 220 on wire 20. The gain of amplifier 221 is set in a well known manner by the ratio of resistor 212 and 221.

Since said series resonant circuit only affects frequencies near the chroma subcarrier, other frequencies pass through resistor 212 without being shunted and appear as the luminance signal at the base of transistor 224 which isolates this medium impedance point from the voltage summer made up of resistors 226 and 206. The output of said voltage summer is amplified to a higher peak to peak voltage by amplifier 231. Resistors 230, 229 and 228 set said amplifier's gain in a well known manner. Capacitor 227 prevents the amplification of any voltage offset that may be present. The output of said amplifier is connected to wire 18 which carries the luminance signal to various processing circuits.

If separate Y/C video is applied, the luminance to terminal 10 and the chroma to terminal 12, then the luminance will pass through above mentioned transistor 204, resistor 206 and amplifier 231 appearing at the same wire 18 as the luminance component of the above described composite signal.

In a similar manner, the separate chroma signal applied to the above mentioned terminal 12 will pass through the above mentioned transistor 216 and be applied through DC blocking capacitor 218 and gain setting resistor 219 to the (−) input of the above mentioned amplifier 220. Thus said chroma signal is applied to the same input terminal of the same amplifier 220 as the above mentioned chroma component of the composite video input. Again amplifier 220 amplifies this signal an supplies it to wire 20 for use by various other circuits in the present processor. The gain for the chroma input is set by the ratio of resistors 219 and 221.

The above described circuit provides a convenient means of providing split luminance and chrominance output signals without regard to whether the input signal is composite or separate luminance/chrominance.

Figure 3A:
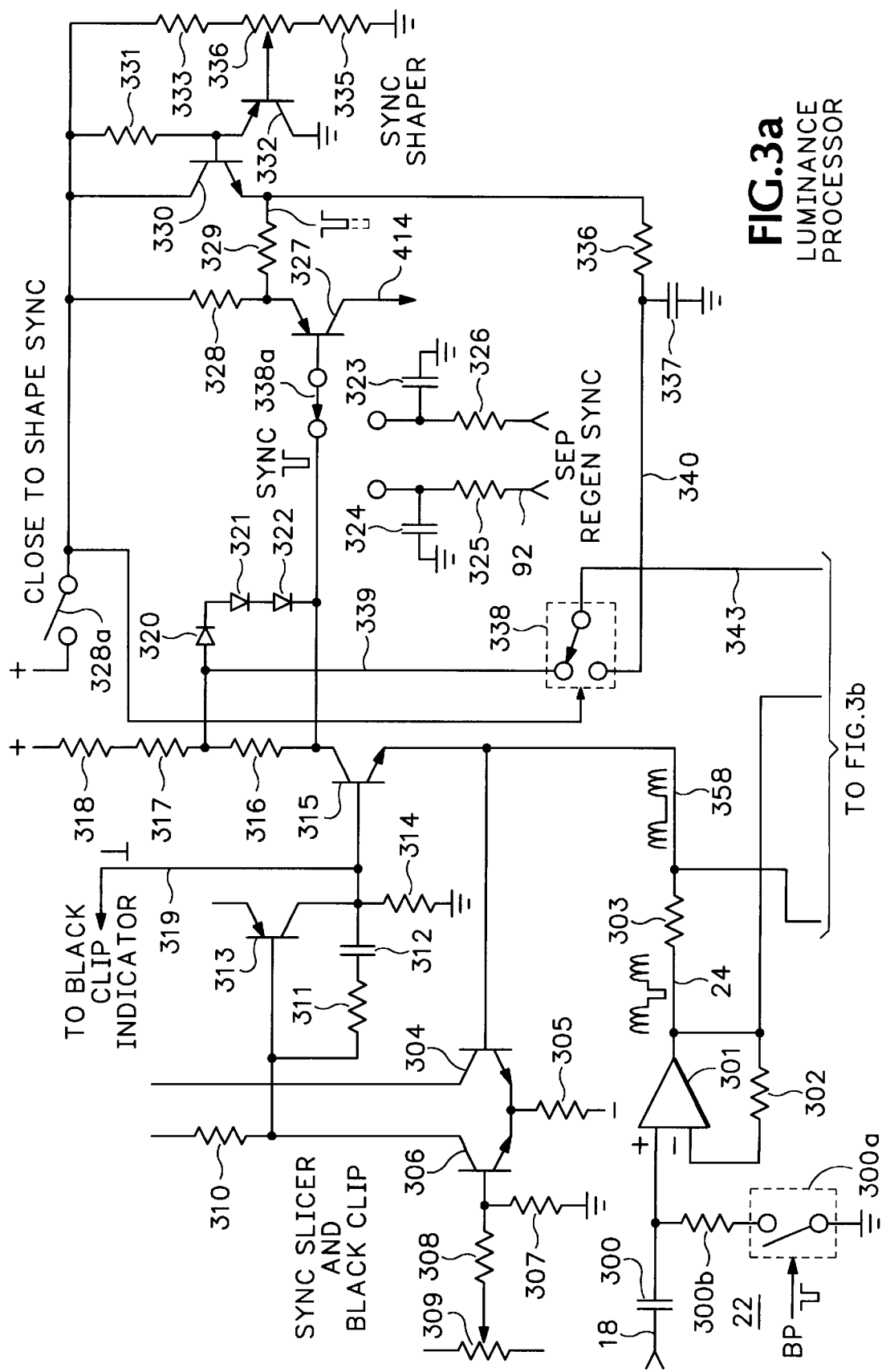

FIGS. 3a and 3b show that luminance is received by the luminance processing section on wire 18 and travels through DC clamp capacitor 300, which in conjunction with back porch keyed clamp 300a and resistor 300b, forces the luminance signal to a predetermined back porch voltage, conveniently ground. Unity gain amplifier 301 provides a low impedance drive for the following sync splitter. Resistor 302 is required by the type of integrated circuit (IC) amplifier used and is not required if other types of amplifiers are used.

Transistor 315 and its below described driving circuitry clip any signals that go below the above mentioned predetermined voltage. With the base of 315 set one diode drop above said predetermined ground voltage, any voltage at point 24 that is negative with respect to ground will cause current to flow through resistor 303 and transistor 315 causing a corresponding voltage drop across the collector resistor made up of the series string of resistors 316, 317 and 318. Since sync signals, in this arrangement, go negative with respect to ground, they are clipped off of the video and appear as a voltage at the collector of transistor 315. My previous embodiment of this circuit, described in U.S. Pat. No. 4,604,646, applied a predetermined voltage to the base of said transistor 315. In this improved embodiment, the base of clipping transistor 315 is within a closed loop to provide a much sharper clipping action which leaves less residual sync on the outputted syncless luminance at point 358 and much less luminance on the outputted sync current through transistor 315.

Transistors 304, 306 and 313 form a well known operational amplifier circuit made of discrete components for economy (a high speed integrated operational would work just as well). Potentiometer 309, through resistors 308 and 307, provides an adjustable reference voltage for application to a differential amplifier made up of transistors 306, 304, shared emitter resistor 305, collector load resistor 310 and inverting transistor 313 with its load resistor 314. Phase compensation resistor 311 and capacitor 312 prevent stray oscillation. Following well known principals, if the voltage applied to the base of transistor 304 goes negative with respect to the voltage applied to the base of transistor 306, the output voltage across resistor 314 will rise, causing the emitter of transistor 315 to rise and counter said voltage applied to the base of transistor 304. In this case the negative voltage is the sync portion of a video luminance signal applied through resistor 303 and the rise of the emitter of 315 limits the voltage at 358 to a voltage equal to that voltage applied to the base of transistor 306 casing negative going components of the video signal to be clipped off. As described above, the clipped off portions of the video signal cause a current to flow through transistor 315 which causes a corresponding voltage to appear across the collector resistors 316, 317 and 318. In this manner the sync is split off of the luminance signal for separate processing. The rise in voltage at the base of transistor 315 occurs when clipping is imminent and is provided to the metering circuit via wire 319 to operate a clipping indicator.

The sync selector 338a and shaper can supply one of the above described split sync, amplitude stabilized sync, sync from the below described sync separator 88 or externally applied sync on line 29 to the following sync amplitude limiter.

Split sync at the collector of 315 appears at a nominal amplitude at the junction of resistors 317 and 316 and is used as the unprocessed sync while a higher amplitude sync is available directly at the collector of 315. Both versions of said sync pulse are negative going and both start, excepting minor leakages, exactly at the positive supply voltage. Hence the amplitude of said sync can be standardized by voltage limiting in the negative going direction.

Transistor 327 receives the high level sync pulses and, if power switch 328a is closed, due to its base-emitter turn on voltage of approximately 0.6 v, suppresses the most positive portion of said high level sync at its emitter output across resistor 328. Since transistor 327 conducts during sync, its collector is used to operate a chroma blanking gate in the below described chroma section. Series resistor 329 and clipping transistor 330 limit the negative excursion of this sync pulse to a level selected by potentiometer 334 whose voltage is coupled through emitter follower transistor 332 to the base of said limiter transistor. The well known combination of a PNP transistor 332 with an NPN transistor 330 provide compensation for the inherent base-emitter voltage drop of both transistors as well as temperature changes.

Selector 338, under control of the above mentioned switch 328a which is a user control, selects either the nominal amplitude sync from 339 or amplitude stabilized sync from clipper 330 via low pass network 336 and 337. Transistor 341 blanks any video that may be present in between said sync pulses. Such video may be due to input: video going below blanking level or more likely as the result of adjusting setup control 355 to darken the picture. Such adjustment adds a DC offset to the picture regions of the video signal and if it is in the negative direction it causes dark regions to be clipped and go through this present sync path. After the sync is blanked, it is clamped to a predetermined level, conveniently ground, by electronic SPST switch 347 acting in conjunction with capacitor 346 and reactive to the back porch pulse received on line 347a. Amplifier 352 amplifies said processed sync for summing with the below described syncless processed video. Resistors 351, 350 and capacitor 349 provide a slightly rising frequency response to compensate for losses in previous circuits. Resistor 348 provides bias for said amplifier during those times when the back porch is absent such as when the input video is disconnected.

The above described syncless luminance signal on wire 358 is applied to the video gain control 44 which adjusts the video gain from some low value to a value greater than unity for purposes of supplying a desired output level from various input levels at its wiper arm 46. Additionally a black level, or setup, control 355 allows adjustment of the brightness of the darker portions of the luminance signal by adding a user variable offset voltage to said syncless video signal. SPDT switch 356, in response to a blanking signal, confines said offset voltage to the active picture regions by selecting a predetermined voltage equal to the video black level during blanking times and the selected offset voltage at other times. As noted above, the sync slicer 26 limits any video that may go below the black level as a result of this adjustment.

The amplitude adjusted video is applied to white clipper circuit 48. Transistors 364 and 365 with resistors 366 and 368 form a well known differential amplifier which turns ON transistor 370 whenever the voltage on wire 52 exceeds a reference voltage on the base of transistor 364. Said reference voltage can be preset or can be derived from the sync amplitude as will be described in the meter description below. Switch 367 provides a means of disabling the present white clipping action while phase compensation capacitor 371 prevents oscillation. The base voltage of clipper transistor 370 is a convenient indication of when clipping action is imminent or in process and is used in the metering section to drive an clipping indicator. Resistor 375 provide a medium source impedance for the luminance signal to be white clipped.

If video blanking is desired, it can be implemented by turning ON transistor 370 during blanking times via resistor 373. Alternatively a blanking transistor 50, which can be any of a NPN or PNP or a FET, can be added from wire 52 to ground. Said blanking signal may obtained from the below described blanking generator or can be generated by any of many well known means. Additionally any periodic signal 377 may be added to said video signal by emitter follower 376 which will override any preexisting signal of a lower voltage. Positive pulses may be added by transistor 378 which can be saturated by a negative pulse applied to its base through resistor 379. Said pulses will be of a voltage equal to that voltage applied to the emitter of said transistor at point 378a.

Figure 1:
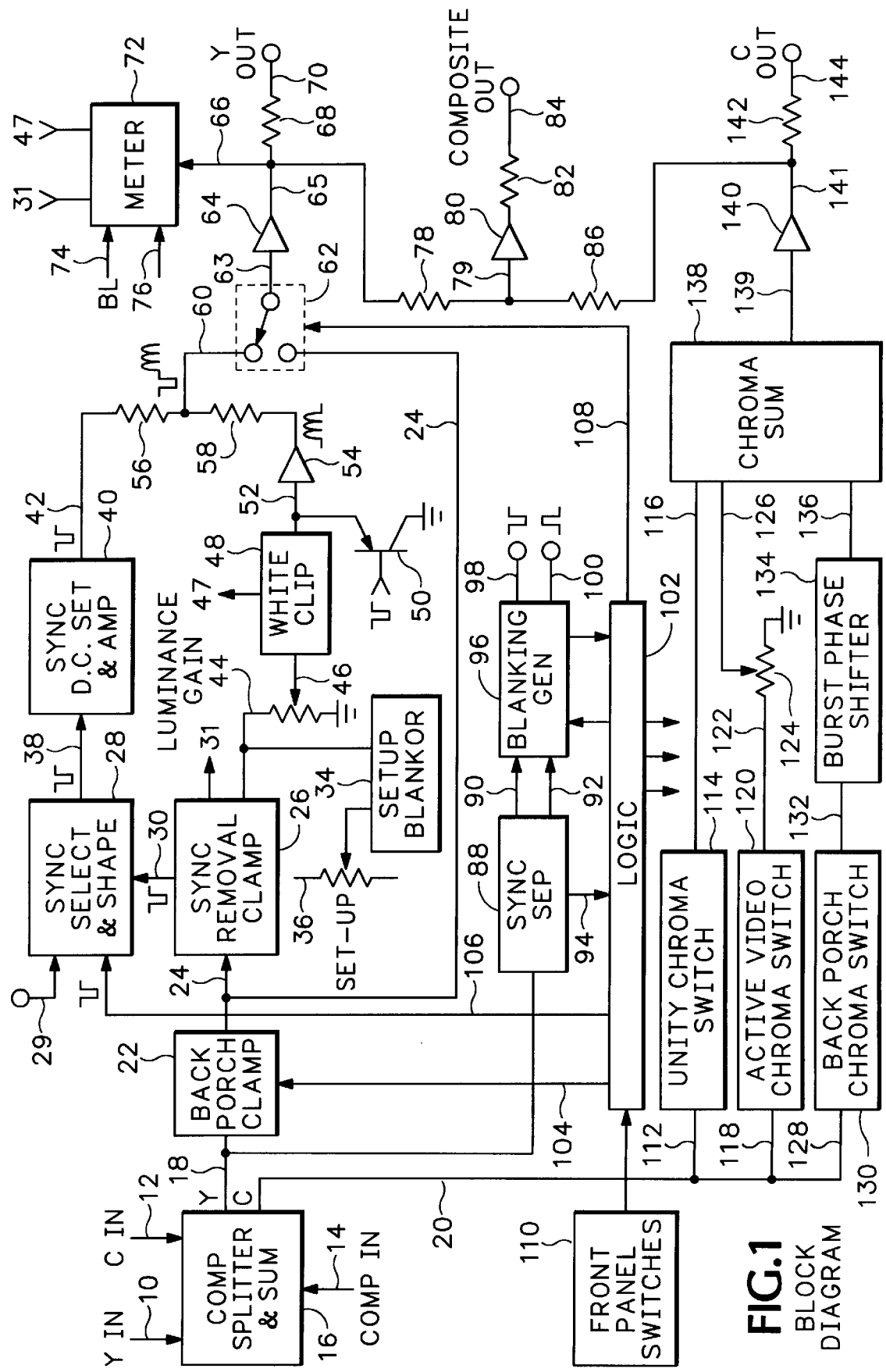
FIG. 1 shows a block diagram of the complete video processing amplifier.

Referring to Block Diagram, FIG. 1, composite video is received by composite video to Y/C splitter 16 at 14 or separate video components, Y and C, are received on 10 and 12 respectively. In either case split Y and C are outputted on lines 18 and 20. Back porch clamp 22 provides Y at a constant DC level to sync splitter 26, which supplies syncless Y on line 32 and sync only on line 30. Potentiometer 36 supplies variable DC to blanker 34 whose output is summed with said syncless Y on line 32 at luminance gain control 44. The output of the luminance gain control 44 on line 46 has any excessively bright Y limited by white clipper 48 which also supplies an indication of white clipping on line 47. Clipped video may be optionally blanked by transistor 50. Amplifier 54 supplies low impedance Y to be summed, by resistors 58 and 56, with sync at 60. Shaped, blanked sync is provided by sync selector and shaper 28, which receives sync from sync splitter 26 via 30. Switch 62 allows selection of processed video on 60 or unprocessed video on line 24 for application to output amplifier 64, which provides output Y via source terminating resistor 68 to output connector 70.

Y from composite splitter and sum circuit 16 is received by sync separator 88, which provides burst flag on line 94 and horizontal and vertical sync on 92 and 90 to the blanking generator 96 which provides blanking and inverted blanking on 98 and 100.

Unity chroma switch 114 receives chroma at 112 and provides attenuated chroma on line 116 to chroma sum 138 to implement the unity mode under the control of signals provided by logic block 102.

Active video chroma switch 120 receives chroma at 118 and provides chroma during the active portions of the video signal via line 122 to the chroma gain control 124, which supplies gain adjusted chroma to the chroma sum 138, thus implementing a saturation control.

Back porch chroma switch 130 receives chroma at 128 and provides chroma during the blanking portions of the video signal via line 132 to the burst phase shifter 134 which supplies phase adjusted chroma to the chroma sum 138, thus implementing a hue control.

Chroma sum 138 sums the various above described chroma signals to amplifier 140 via line 139. Amplifier output 141 is relayed to the C output terminal via source terminating resistor 142.

Logic block 102 supplies various control signals, including back porch clamp on line 104, sync gate via 106 and unity via 108 to other parts of the circuit in response to front panel switches 110, sync via 94 and blanking.

Amplifier 80 mixes Y, via resistor 78, and C, via resistor 86, at its input 79, providing composite video via source terminating resistor 82 to connector 84.

Meter circuit 72 receives video at 66, blanking at 74, back porch at 76, black clipping indicator at 31 and white clip indicator at 47.

Gain adjusted, white clipped video at 52 is amplified by amplifier 384 whose gain is set in a well known manner by resistors 383 and 382 and whose high frequency correction is set by resistor 380 and capacitor 381.

Syncless luminance from amplifier 384 and processed sync from amplifier 352 are combined in a resistive mixer made up of resistors 56 and 58 to form a normal luminance signal containing sync. Resistor 353 and potentiometer 354 allow precise setting of the bias voltage of the combined video signal so that it will match the unprocessed video signal at 24 as supplied through anti-oscillation resistor 385 to switch 62, which selects between unprocessed and processed luminance to implement the luminance portion of both the UNITY and SPLIT operational modes.

Switch 62 can select either the processed luminance on wire 60 for normal operation or unprocessed luminance through resistor 385. The UNITY mode places this switch continuously in the position that passes unprocessed luminance from 385 to its output on wire 63 while the SPLIT mode alternately connects each of the two available inputs to output wire 63 at a horizontal rate and timed to place the switch time approximately in the center of the visible picture. If the user selects neither the SPLIT or UNITY mode, the switch continuously connects processed luminance on wire 60 to output wire 63.

The chroma processing shown in FIG. 4 receives chroma on wire 20 and applies it to one of three chroma switches 114, 120 and 130. Three control signals on wires 839, 842 and 835 determine which one switch is ON at any one time.

Switch 114 is a single series transistor, used as a bilateral switch, that conducts subcarrier from wire 112 to wire 116 when turned ON by lowering the base voltage below ground. Switches 120 and 130 operate in a similar fashion except an additional shunt transistor 410 and 433, of polarity opposite the associated series pass transistor, turns ON when the series pass transistor 407, 418 is OFF so as to reduce the amplitude of any signal that may leak through the series switch. Each transistor of a given switch pair has a series base resistor to a common control signal. Such an arrangement will ensure that, for a given switch, one transistor is always ON while the second is always OFF. Additionally each transistor in switch 120 is of opposite polarity compared to those in switch 130 so that a common control wire will alternately operate each of said switches in a SPDT fashion. I.e., when the burst flag signal on wire 835 is high, switch 130 will be ON and conduct the chroma to the burst phase shifter 134 and switch 120 will be OFF and not conduct chroma to the chroma gain control 124. Conversely when said burst flag is low, switch 120 will pass chroma to said chroma gain control and switch 130 will not pass chroma to said burst phase shifter.

In this manner, in the normal operational mode, the chroma processor alternatively directs the chroma signal to the burst phase shifter and the chroma gain control. When the user selects UNITY mode, wire 839 goes low causing transistor 400 to conduct via base resistor 401 and forces switch 130 OFF by pulling the base of transistor 418 low via diode 427. Switch 120 is held OFF by virtue of the fact that the burst flag on wire 835 is forced to the high state in the logic section 102. In this manner, when said user selects said UNITY mode, all of the chroma signal passes through unity chroma switch 114.

Unity chroma switch 114 includes the above described series switching transistor 400, series coupling capacitor 402, voltage divider resistors 403 and 404 and phase compensation capacitor 403a. Variable resistor 405 allows adjustment of the chroma level while in the present UNITY mode while resistor 406 allows 405 to be a narrower range for ease of setting.

Active video chroma switch 120, in normal operation, passes chroma during the active line, or picture, times of the video signal. During said times said chroma signal is passed through coupling capacitor 411 and series resistor 412 to potentiometer 124 which is a user control for setting the chroma gain or saturation. Transistor 413, responsive to control signal on wire 414 supplied by the above described sync slicer, and coupling capacitor 415 serve to blank, or remove, high frequency sync components from the chroma signal when sync is being amplitude limited. Variable resistor 416 is an adjustment for the chroma level during active video times so that said user adjustable control can be centered for unity gain, while resistor 417 allows 416 to be a narrower range for ease of setting.

Back porch chroma switch 130, in normal operation, passes chroma during the color burst times of the video signal. During said times said chroma signal is passed through coupling capacitor 419 to phase shifting inductor 420 and phase shifting capacitor 422, which in conjunction with potentiometer 421, provide a user adjustable phase shift of the chroma burst. Resistors 423 and 424 reduce amplitude variations as said potentiometer is adjusted through its range as described in my U.S. Pat. No. 5,311,298. Variable resistor 425 is an adjustment for the chroma level during burst times, while resistor 426 allows 425 to be a narrower range for ease of setting.

When the user selects the MONO mode, the back porch chroma switch is forced OFF by wire 842 going negative, which applies said negative voltage through diodes 428 and 429 to the bases of transistors 418 and 433 respectively. Said negative voltage is at a fairly low impedance which overrides the burst flag signal applied to these same bases through resistors 431 and 432.

Figure 5:
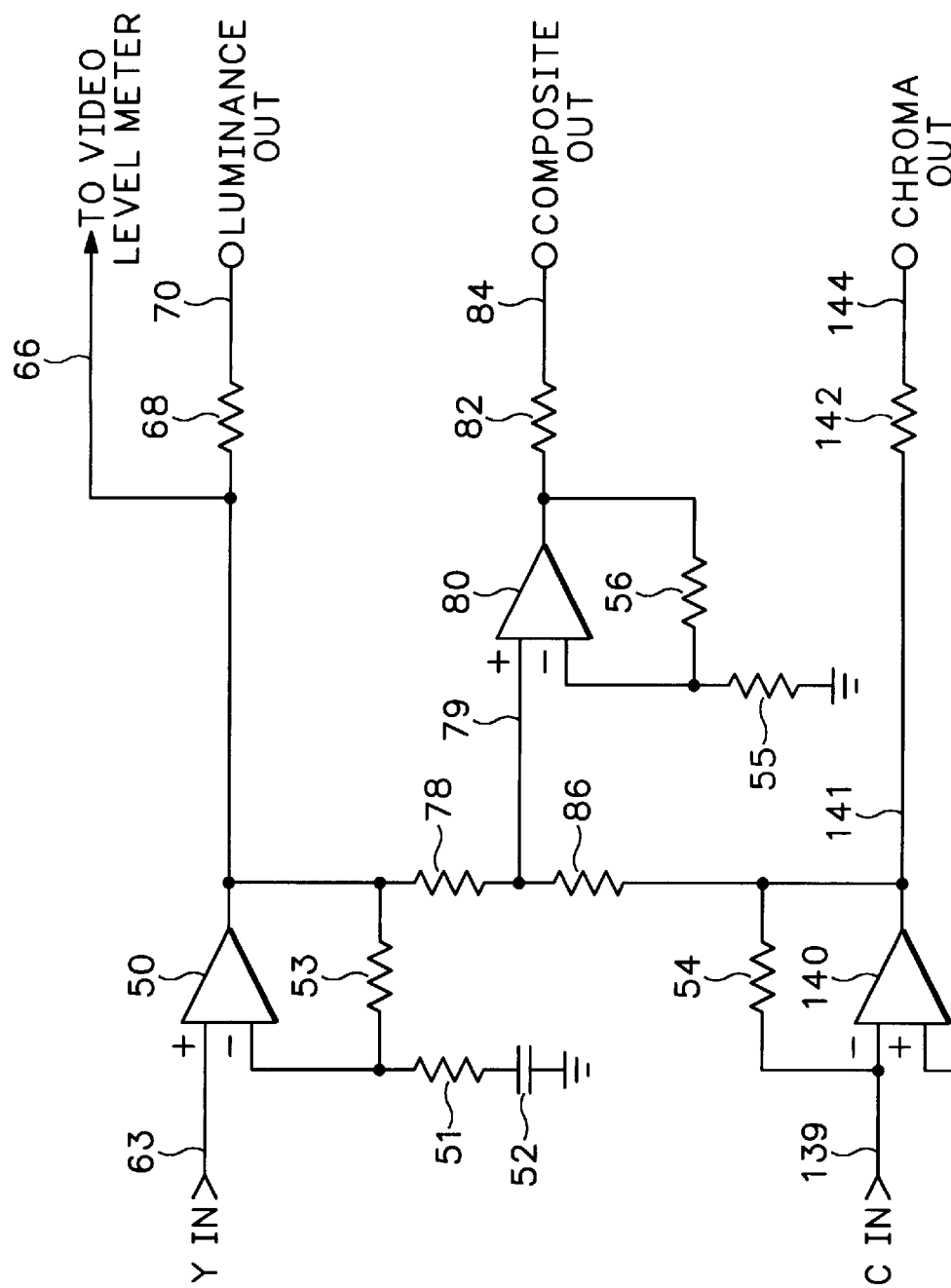
FIG. 5 shows the output amplifier and composite video summer.

The above described processed luminance and chrominance is amplified and supplied to output connectors by the apparatus shown in FIG. 5. Processed luminance on wire 63 is amplified by operational amplifier 50 and supplied through source termination resistor 68 to output connector 70. Resistors 53 and 51 and capacitor 52 provide high frequency compensation. Processed chrominance on wire 139 is amplified by operational amplifier 140 and supplied through source termination resistor 142 to output connector 144. Resistor 54 in conjunction with resistors 405, 406, 416, 417, 425 and 426, of FIG. 4, set the gain of said operational amplifier during the various times and modes.

A composite output is provided by summing the luminance and chroma signals in resistors 78 and 86, amplifying the result in operational amplifier 80, whose gain is set by resistors 55 and 56, and passing the composite video through source termination resistor 82 to composite output connector 84.

Figure 6B:
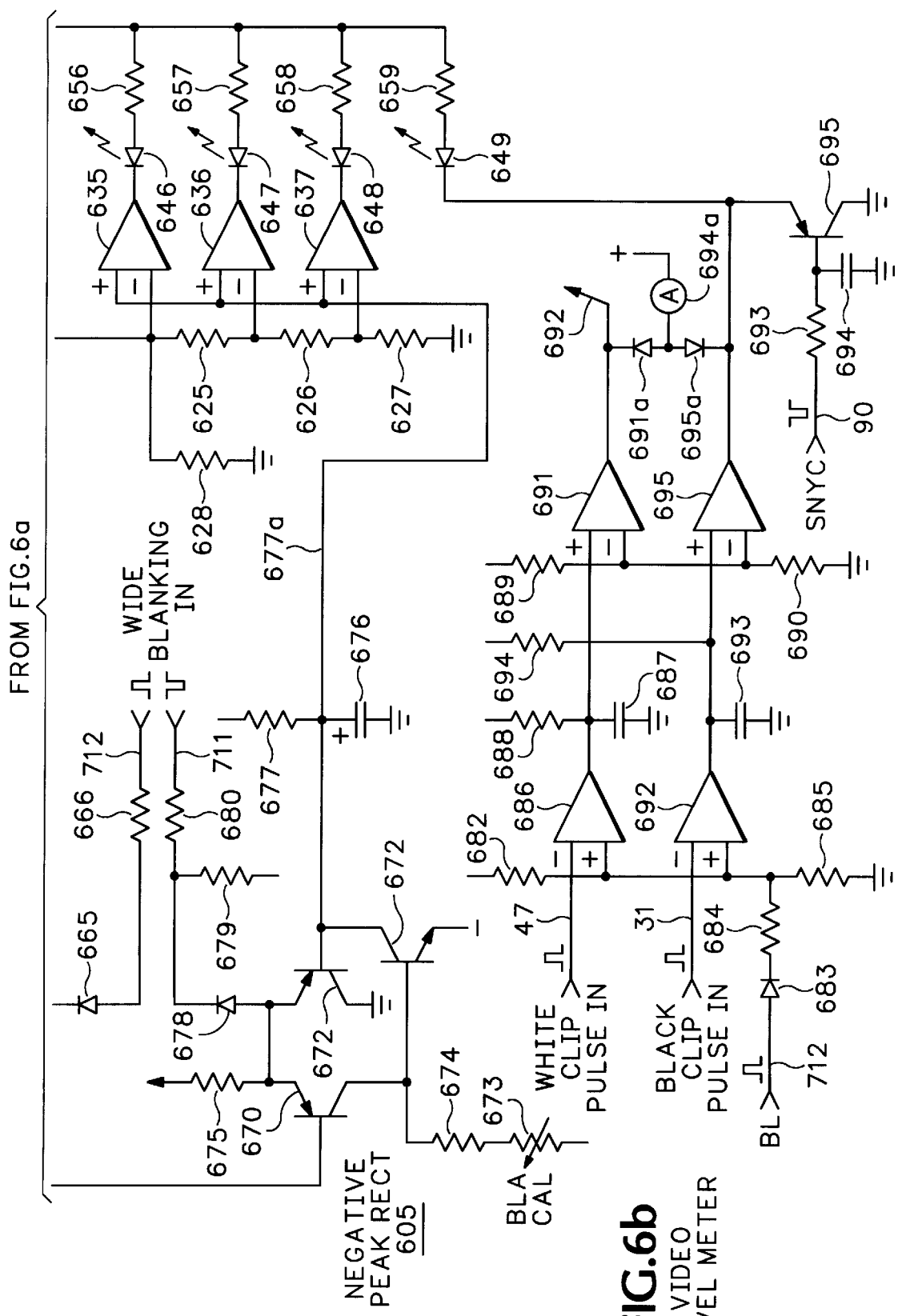

The video level meter shown in FIGS. 6a and 6b consists of six sections.

Standard video has 40 units of sync to 100 units of video, so if the sync amplitude is measured, inverted and multiplied by 2.5, the result is a voltage equal to what should be peak white. Sync rectifier 603 and associated inverter provide this implied 100% reference derived from sync amplitude.

The video level is measured by positive peak detector 604, a half wave rectifier with a long time constant in its output capacitor which effectively holds the most positive signal seen in the last second or two. Gating inhibits the rectifier during blanking so that any vertical interval signals won't affect the output voltage.

The black level is measured by negative peak detector 605, a second half wave rectifier with a long time constant in its output capacitor which effectively holds the most negative signal seen in the last second or two. Gating inhibits the rectifier during sync so that said sync signals won't affect the output voltage.

Pulses indicative of clipping are applied to the white and black clip pulse processors which widen and amplify these narrow pulses indicative of clipping, provided by the luminance processor, so that they will show a visible indication on the chosen display device.

A display device accepts the voltages indicative of the peak video level, the black video level, a full scale (100%) reference, and optionally clipping pulses, and displays the result in visible or audible form. One possible embodiment includes a multi step bargraph driver composed of a resistor string, comparator string and a string of LED. Separate bargraph drivers are provided for the black and video level readouts.

Luminance on wire 66 is back porch clamped such that the back porch of the video signal is at a predetermined voltage, ground in this example, by the action of back porch keyed switch 601 and capacitor 600.

Said back porch clamped luminance is received by the sync rectifier 603 which includes operational amplifier 606 which provides a negative output signal whenever said clamped luminance on its (+) input terminal goes negative with respect to the voltage on its (−) terminal which is supplied by filter capacitor 610 which in turn is driven in the negative direction through diode 607 by the above mentioned negative output signal. Said negative output signal lasts until such time that capacitor 610 charges to a voltage equal to the most negative excursion of said clamped luminance. In this manner, capacitor acquires a voltage equal to the sync tips of the luminance signal since sync tips are the most negative part of a normal video signal. Diode 608 supplies negative feedback around said amplifier when the amplifier output goes positive to prevent amplifier saturation which would slow its response. Resistor 609 isolates said negative feedback from capacitor 610. Since standard video has a positive going peak white voltage equal to 2.5 times the negative going sync tip voltage, multiplying the above derived sync tip voltage by a negative 2.5 times will produce a voltage indicative of the peak white voltage to be expected. A conventional inverting operational amplifier, consisting of amplifier 612, resistors 611, 614 and adjustable resistor 615 provides said multiplication by −2.5. Capacitor 613 provides a low pass filter action to smooth the multiplied output.

Positive peak detector 604, a well known configuration, is constructed from a differentially connected pair of NPN transistors driving an inverting PNP output stage which charges capacitor 667 to the peak input voltage. Resistor 668 provides a very slow discharge path so as to cause the output voltage across 667 to go to zero in the absence of an input signal. Whenever wire 602 goes to a positive voltage with respect to the voltage on capacitor 667, transistor 660 will conduct causing transistor 662 to also conduct thusly charging the capacitor to a voltage equal to said positive voltage. If the voltage on wire 602 is less negative with respect to the voltage on capacitor 667 then transistors 660 and 662 are kept OFF and capacitor 667 slowly discharges through resistor 668 and the base of transistor 661. Diode 665 and resistor 666 force all three transistors OFF when the blanking, applied to line 712, is positive. This prevents reading signals that frequently appear in the blanking regions of a video signal such as data, VITS and time code.

Negative peak detector 605 operates in a corresponding manner to the above described positive peak detector except that all transistors have been replaced by their complements, the diode is reversed and the blanking signal is inverted. Added resistor 679 adds a DC offset to said blanking signal to accommodate the fact that the sync signal is below ground but still must be gated out. The output is a positive voltage that follows the most negative portion of the inputted luminance signal during those times when the blanking signal allows it to operate.

In this preferred embodiment, the above mentioned blanking signals are wider than standard blanking so as to not read video signals near the edges of the picture which ay actually be at blanking level due to previous processing.

One preferred embodiment of a display device is described below, however it should be understood that there are many ways of visually presenting two voltages, optionally in relation to a 100% reference signal. For instance, two analog meters may be used to display respectively, the black and the peak white voltage levels without the use of a 100% reference voltage or with the use of automatic gain circuits as shown in my previous U.S. Pat. No 4,604,646. One or two vacuum fluorescent displays may also be used.

The present display device consists of a voltage divider string made up of resistors 620–627 voltage comparators 630–637 light emitting diodes (LEDS) 640–649 and current limiting resistors 650–659. One input of each comparator is connected to the output of a peak detector and the other input to a tap on said voltage divider. In the present display five comparators and five LEDs are dedicated to the peak video display while three comparators and three LEDs are dedicated to the black level display. Two more LEDS are used to indicate that the video is being, or is about to be, clipped.

Comparator 631 is typical of each of the positive peak LED drivers. Its (+) input is connected to a tap on the voltage divider while its (−) input receives a voltage proportional to the positive peak voltage on wire 668a. If said voltage if greater than the voltage on said tap, the comparator's output will be at ground level which causes the associated LED 642 to light with resistor 652 limiting the diode's current. If said voltage is not greater than said tap voltage then the LED will remain unlit. It can be seen that when a particular LED is lit, all of the LEDs connected to taps lower on the voltage divider chain will also be lit, producing a light bar of length proportional to the voltage on wire 668a. Additionally, when the inputted luminance exceeds the voltage at the top of said voltage divider, all LEDS will light and conversely when the inputted luminance falls to zero, no LEDs will light. It will be recognized the choice of five LEDs with linear steps of 20% for the positive peak luminance display is quite arbitrary and might just as well have been 3 LEDs or 20 LEDs. The exemplified five steps were chosen to be even steps of 20% each, other numbers of LEDs will optimally display different size steps. For instance 20 LEDs could display steps of 5%.

Alternatively the steps could be made non linear by choosing unequal resistor values for the divider.

Figure 9A:
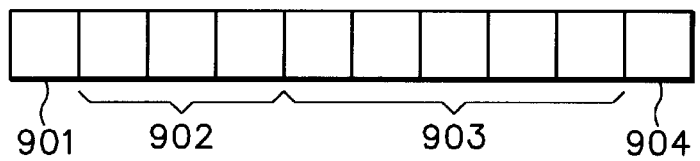
FIGS. 9a–9e show embodiments of the level metering display.

In FIG. 9a, one preferred embodiment, the group of indicators 903, typically LEDs, displaying the peak video level are placed immediately to the right of the group of indicators 902 that show the black level with clipping indicators 901 and 902 placed at the ends, white clip indicator 904 to the right of the peak video level indicators 903 and the black clipping indicator placed to the left of the black level indicator 902. Such a group forms one continuous bar which lights from the junction of the black and white indicators outwards towards the left and right extremes as the metered luminance signal varies.

Figure 9B:
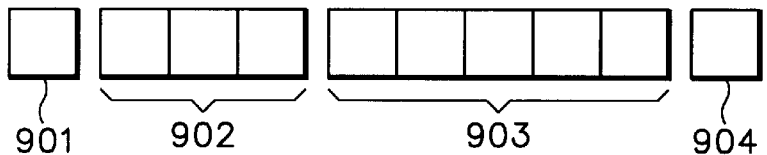
Figure 9C:
Figure 9D:
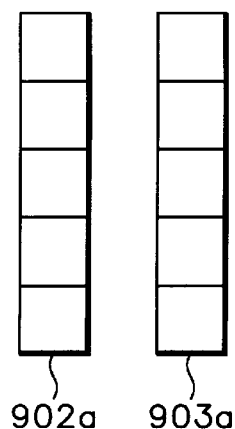
Figure 9E:
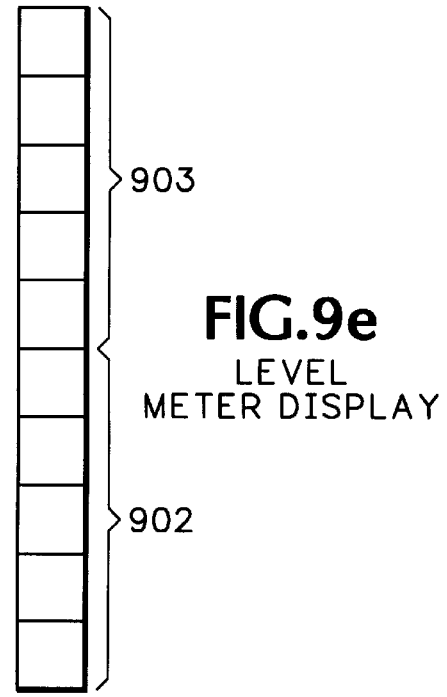

Alternatively a space can separate the groups as shown in FIG. 9b, or the groups can be placed one above the other as shown in FIG. 9c. FIG. 9c also shows that the black video and peak video indicators can have various numbers of individual elements. FIG. 9d shows that the indicators can be placed side by side with each group vertically oriented. FIG. 9e shows that the indicator arrangement of FIG. 9a can be placed vertically.

Returning to FIGS. 6a and 6b, comparators 635–637 work in a corresponding manner to the above described comparators 630–634 with three exceptions: 1) In order to provide a visually continuous display, the LEDS light when the voltages are below, instead of above, the voltage divider taps. 2) Arbitrarily, a lesser number of LEDs are used. 3) The input is supplied by the negative peak detector 605. The reversal of the LED lighting order is accomplished by connecting the comparator (−) inputs to the voltage divider taps instead of to the input voltage to be metered. Again the number of LEDs is an arbitrary choice and could have been any number. They could be linear or non linear steps. In the present example, the resistors are chosen for steps of 2.5%. Resistor 628 determines the uppermost step.

Pulses indicative of white clip are received on wire 47 and applied to one input of comparator 686 whose reference input is supplied by a voltage divider consisting of resistors 682 and 685 which supply a small positive voltage except for times during blanking when this voltage is raised by the application of blanking through diode 683 and resistor 684 which serve to effectively disable the comparator during blanking. The open collector output of said comparator rapidly discharges capacitor 687 when even a narrow pulse is received. Said capacitor is slowly charged by resistor 688, such an arrangement being well known as a pulse stretcher. Comparator 691 provides a steady low output whenever the voltage on capacitor 687 is lower than the voltage on its other input terminal as set by the voltage divider consisting of resistors 689 and 690. Thus, even a narrow pulse indicative of clipping will cause the LED to light for a substantial period of time.

If desired, an audible indication of clipping can be provided by adding an audible indicator 694*a* from the positive supply to either of amplifier 691's or 695's output. If an audible indication is desired when either white or black clipping occurs, then diodes 691*a* and 695*a* can form an OR gate such that a low on either amplifier output will sound the audible indicator.

Since the above described present embodiment produces a blank display in the absence of a video signal, an additional transistor can light any chosen LED when sync from the sync separator disappears, typically in the absence of an inputted video signal. When sync is present on line 90 it is applied to an integrator comprising resistor 693 and capacitor 694, which produces a steady high output which keeps the emitter of transistor 695 high which does not light said chosen LED. However when input video is not present, the sync separator provides a steady low voltage output which produces a low at the emitter of transistor 695 causing said chosen LED to light.

Figure 7:
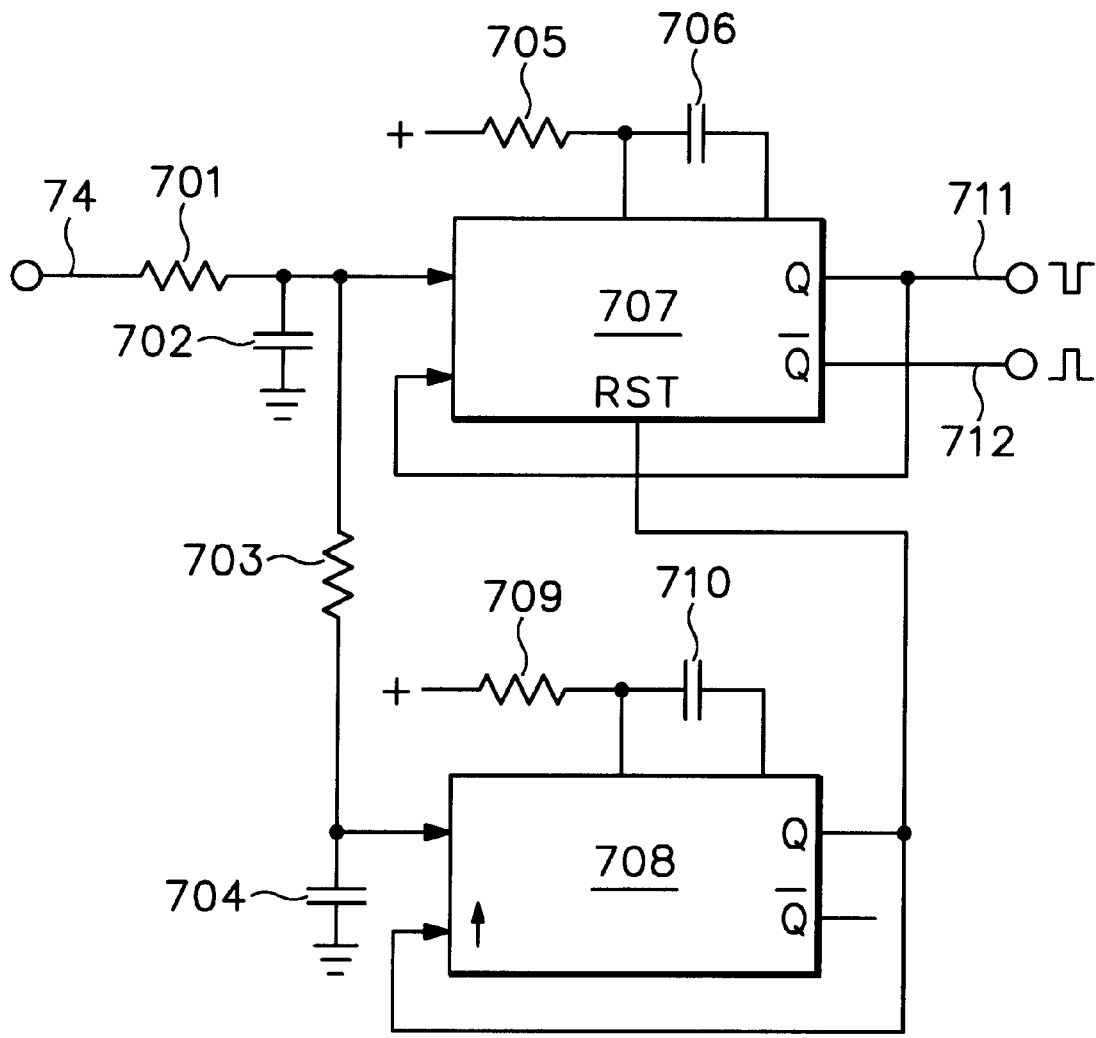
FIG. 7 shows the blanking generator used with the video level meter.

While standard blanking can be used in the above described metering circuitry, it preforms better if a wider than normal blanking is created. Although circuits providing such are well known, a present embodiment is shown in FIG. 7. Mixed blanking including both horizontal and vertical components is received on wire 74 and slightly delayed by resistor 701 and capacitor 702 in order to delay the trigger to one-shot multivibrator 707 which provides a pulse slightly shorter that the active portion of one horizontal video line. Since the start was delayed by the above mentioned RC delay and the one-shot multivibrator delay is shorter than one line, the following untriggered time is wider than the normal horizontal blanking and is used as horizontal blanking in the meter apparatus. An RC filter and delay circuit composed of resistor 703 and capacitor 704 remove the horizontal component of inputted blanking while also delaying the vertical blanking. In the same manner as for the just described horizontal blanking generator, one shot 708 provides a wider than normal vertical blanking pulse. In order to provide a mixed blanking, containing both horizontal and vertical components, the present vertical blanking pulse is applied to the reset input of one shot 707 which then becomes inactive during the vertical blanking time. Thus a mixed, negative going, blanking is outputted from one-shot multivibrator 707 at the Q output and a positive going blanking is outputted from the NOT Q terminal. Negative pulses are outputted from the Q output since these pulses are the time periods after the one-shot multivibrator has timed out and is not yet triggered by the next input pulse.

FIGS. 8*a* and 8*b* show the sync separator, blanking generator and mode logic circuitry. Composite luminance is received on wire 18, low pass filtered by resistor 801 and capacitor 802 and coupled by capacitor 803 to the input of integrated circuit sync separator 804 which supplies vertical sync on wire 90, mixed horizontal and vertical sync on wire 92 and a back porch pulse on wire 94 which is timed to start just after the end of horizontal sync and last almost to the end of horizontal blanking. Resistor 805 and capacitor 806 set certain internal operating points of said sync separator IC.

One-shot multivibrator 807 is triggered by the end of vertical sync received on wire 90 and is arranged, by the choice of resistors 809 and 810 and capacitor 811, to time out at the end of vertical blanking. Said time out triggers a second one shot multivibrator 808 which is arranged, by the choice of resistors 812 and 813 and capacitor 814, to time out at the start of the next vertical blanking period. Since said multivibrator is turned ON during the active picture, a negative blanking pulse appears at the Q output while a positive blanking pulse appears on the NOT Q terminal. The NOT Q output of one-shot multivibrator 807 is wired back to its falling edge trigger to prevent retriggering should stray pulses be present in the input video. Similarly, the NOT Q output of the second one-shot multivibrator 808 is connected to its own falling edge trigger as well as the previous one-shot multivibrator's 807 reset pin to provide additional immunity to stray input pulses.

Horizontal blanking generating one-shot multivibrators are wired in manners corresponding to the just described vertical generating one-shot multivibrators with three exceptions. 1) one shot 815 is triggered from mixed sync on wire 92. 2) the second one-shot multivibrator 816 is inhibited during the entire vertical blanking time by the application of vertical blanking to its reset pin. This effectively mixes the horizontal and vertical blanking to produce negative going mixed blanking at the Q output of 816 on wire 98 and positive going mixed blanking at the NOT Q output on wire 100. 3) The ON time of 816 can be shortened by applying extra current through transistor 824 and resistor 823 in order to provide a special blanking of about 50% duty used to generate a split screen display where the unprocessed video signal is passed for about 50% of each line and the processed video signal is passed for the remainder of the time.

A back porch pulse suitable for operating video clamp switches 300*a* (FIG. 3*a*) and 601 (FIG. 6*a*) is produced on wire 843 by inhibiting any clamp pulses that might occur outside of the video blanking time through the gating action of diode 847, which receives mixed blanking from one-shot multivibrator 816, and resistor 846 which receives a back porch pulse from sync separator 804. Additionally, said clamp pulses may be inhibited for the whole of the vertical blanking time by closing switch 845 which receives positive going vertical blanking from one-shot multivibrator 808 through diode 844.

Resistor 831 supplies back porch pulses from said sync separator 804 to inverter transistor 833 which amplifies said pulses to extend essentially from the negative supply rail to the positive supply rail for application to wire 835 for use by the chroma switches 114, 120 and 130 (FIG. 4) as a burst flag pulse.

A user operable MONO switch 841 supplies a negative voltage to wire 842 when activated.

A user operable SPLIT screen switch 827 shortens the ON time of one-shot multivibrator 816 as described above by supplying base current to transistor 824 through bias resistor 826 and shunt base resistor 825. Additionally transistor 828 allows the above described wide blanking to pass through the series resistors 830 and 829 to the luminance switch on wire 390. Emitter follower 832*a* relays these same wide blanking pulses through resistor 832 to the above described burst pulse inverter 833.

A user operable UNITY switch 840 disables all user adjustments to pass the video signal from the input connectors 10, 12 and 14 (FIG. 1) to the output connectors 70, 84 and 144 (FIG. 1) essentially unchanged. Said unity switch supplies a negative voltage on wire 839 for use as described previously in the chroma section and, through resistor 837 and diode 836, forces wire 390 to go to ground to cause the luminance bypass switch to select input video instead of processed video. Forcing wire 390 to ground also forces the chroma burst flag pulse to the high or ON state through the above described path that includes transistor 832*a*.

The above described apparatus fits neatly on a single printed circuit board with power supply, all controls, all switches, input and output connectors. The only external component is a "plug in" power transformer. While the LED bargraph display could be mounted on said printed circuit board, it mounts to the front panel being connected by a flat plug in cable. While the above described apparatus is being manufactured as a single unit, such a compact arrangement lends it self to putting more than one identical processor in one metal or plastic cabinet, typically two processors. Many customers have found this dual video processor particularly useful for adjusting the outputs of two cameras when such cameras are used in pairs to cover a live event. Additionally many use the dual processor to adjust the outputs of two source video tape machines when editing from two or more tapes into one final tape.

One skilled in the art will recognize that many substitutions are possible within the scope of the presently disclosed apparatus. For instance all of the above described amplifiers may be either integrated circuits or made from discrete components. One-shot multivibrators can be replaced by other time delay and pulse generation devices, different types of switching devices may be used where mechanical, transistor or integrated circuit switches are shown. All controls, including switches, may be replaced by other components that serve the same function, for instance to provide computer control.

What is claimed is:

1. A processing circuit for processing a video signal comprising:
   an input circuit for receiving a video input signal,
   means for clamping the video signal to a predetermined back porch level of said video signal,
   means for separating the luminance signal and sync signal portions of the clamped video signal comprising a series resistor and a unilaterally conducting means for conducting at levels below the back porch clamping level whereby said sync signals are coupled through said unilaterally conducting means and substantially eliminated from the luminance signal portion at the input of said unilaterally conducting means,
   closed loop means for sharpening the conduction point of said unilaterally conducting means,
   means for processing said luminance signal, and
   means for recombining the luminance signal portion with said sync signals coupled through said unilaterally conducting means to provide an output signal,
   whereby video without sync is provided at said input of said unilaterally conducting means and sync is provided through said unilaterally conducting means.

2. The apparatus according to claim 1 wherein said closed loop means is a differential amplifier.

3. A processing circuit for processing a video signal comprising:
   an input circuit for receiving a video input signal,
   a video clamping circuit to provide clamped video,
   a sync processing circuit, to provide processed sync from said clamped video signal,
   a video processing circuit to provide processed video from said clamped video,
   a means for combining said processed sync and said processed video,
   a composite input terminal to supply composite video to a frequency sensitive splitting circuit which provides chroma current to a combining amplifier and luminance voltage to a summing combiner,
   a chroma input terminal to provide chroma to a second input of said combining amplifier, and
   a luminance input terminal to provide luminance to a second input of said summing combiner,
   whereby chroma is outputted at the output of said combining amplifier and luminance is outputted at the output of said summing combiner when a video signal is received either on the composite input wire or separate luminance and chroma are received on a pair of wires,
   wherein said video clamping circuit provides clamped video from said luminance.

4. A processing circuit as in claim 3 where said frequency sensitive splitting circuit is composed of a series resistive element between said composite input terminal and said first input of said summing combiner and a series tuned circuit between said first input of said summing combiner and said first input of said combining amplifier.

5. A processing circuit for processing a video signal comprising:
   an input circuit for receiving a video input signal,
   a video clamping circuit to provide a clamped video signal from said video input signal,
   a video processing circuit to provide processed video,
   a means for combining sync and video,
   a differential amplifier being responsive to said clamped video signal at one terminal and a voltage at another terminal, and
   an input resistor to supply said clamped video signal to the emitter of a transistor whose base is coupled to the output of said differential amplifier and whose collector supplies a current representative of the sync portion of said clamped video signal,
   whereby a sync free video signal is available at said emitter of said transistor and the sync portion of said sync bearing video signal is available from said collector of said transistor,
   a sync processing circuit to provide processed sync from said sync portion of said sync bearing video signal,
   wherein said video processing circuit provides said processed video from said sync free video signal,
   wherein said means for combining sync and video combines said processed sync and said processed video.

6. The apparatus as in claim 5 where said sync representative current is converted into a sync voltage by a resistor.

7. The apparatus as in claim 6 where said sync voltage is limited to a nominal voltage by a voltage limiting device.

8. The apparatus as in claim 5 where said voltage is chosen to approximate the blanking level of said sync bearing video signal.

9. The apparatus as in claim 5 where a signal indicative of clipping is taken from the output of said differential amplifier.

10. The apparatus as in claim 5 where a variable, blanked, voltage is applied to the emitter of said transistor to effect a change in the black level of said video signal.

11. The apparatus as in claim 5 where a blanking circuit ensures that the sync output of said collector is free of video in between said sync pulses.

12. A processing circuit for processing a video signal comprising:

an input circuit for receiving a video input signal, a video clamping circuit to provide clamped video from said input circuit, a sync processing circuit to provide processed sync from said clamped video signal, a video processing circuit to provide processed video from said clamped video, a means for combining said processed sync and said processed video, a means for providing a voltage representative of the peak white and black portions of said combined video and applying said voltage to a multi step bargraph driver, an array of light emitting elements, responsive to said bargraph driver, arranged in a straight line and including at least two, immediately adjacent, portions, a first said portion indicating the white level of said video signal, and a second said portion indicating the black level of said video signal, whereby a single line of light emitting elements indicate both said black video level and said white video level.

13. The apparatus as in claim 12, further comprising of one or more light emitting elements to indicate clipping of said video signal.

14. The apparatus as in claim 13, wherein said one or more light emitting elements are not necessarily adjacent one another.

15. The apparatus as in claim 12, further including one or more light emitting elements to indicate clipping, wherein said one or more light emitting elements to indicate clipping are not immediately adjacent one another.

16. The apparatus as in claim 12 where said white indicating portion of elements is vertically displaced, and aligned with, said black indicating portion of elements.

17. The apparatus as in claim 12 where said white indicating portion of elements is vertically aligned, and horizontally displaced from, said black indicating portion of elements.

18. A processing circuit for processing a video signal comprising:

an input circuit for receiving a video input signal, a video clamping circuit to provide clamped video from said input circuit, a sync processing circuit to provide processed sync from said clamped video signal, a video processing circuit to provide processed video from said clamped video, a means for combining said processed sync and said processed video into a composite video signal, a peak voltage detector arranged so as to provide an output voltage proportional to said sync signal portion of said composite video signal, an inverting circuit to receive said sync proportional voltage and provide a white reference voltage, nominally equal to the peak white voltage of said video signal, an adjustable element to adjust said white reference voltage, and a metering circuit utilizing said white reference voltage as the full scale reference for said display, whereby the display reads relative video parameters, independent of the overall video voltage.

19. A processing circuit for processing a video signal comprising:

an input circuit for receiving either a video input signal or separate Y/C, a means of providing a luminance output and a chroma subcarrier output from said video input signal or separate Y/C, multiple chroma subcarrier processing means to process said chroma subcarrier, a plurality of switches to apply said chroma subcarrier from said chroma subcarrier input to one of said processing blocks at any one time, a first processing means to adjust the gain of said chroma subcarrier signal, a second processing means to adjust the phase of said chroma subcarrier signal, a third processing means to pass the chroma subcarrier with a predetermined phase and gain, a sum means to receive the outputs of each of said processing blocks and provide a single output, and a control means to provide at least a burst flag and a fixed level indicative of a second mode, whereby the phase and gain of said chroma subcarrier can be adjusted independently in one mode and said chroma subcarrier can be passed to said single output with a predetermined gain and phase in a second mode.

20. The apparatus of claim 19 wherein said phase adjusting means consists of:

a chroma subcarrier input terminal connected to a first terminal of an inductor and to a first terminal of a capacitor, a potentiometer whose two outer terminals are connected respectively to the second terminals of said inductor and said capacitor and whose movable arm is connected to a output terminal, a resistor connected between said input terminal and said output terminal, and a resistor connected between said output terminal and ground, whereby the phase of said chroma subcarrier can be adjusted with reduced amplitude change.

* * * * *